(12) United States Patent
Perumalla et al.

(10) Patent No.: US 12,131,298 B2
(45) Date of Patent: Oct. 29, 2024

(54) PARTICIPATION OF ROBOTS IN DEFECT REPAIR

(71) Applicant: INTERNATIONAL BUSINESS MACHINES CORPORATION, Armonk, NY (US)

(72) Inventors: Saraswathi Sailaja Perumalla, Visakhapatnam (IN); Sarbajit K. Rakshit, Kolkata (IN); Sathya Santhar, Ramapuram (IN); Venkataramana Bora, Visakhapatnam (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 365 days.

(21) Appl. No.: 17/806,981

(22) Filed: Jun. 15, 2022

(65) Prior Publication Data

US 2023/0410061 A1    Dec. 21, 2023

(51) Int. Cl.
*G06Q 10/20* (2023.01)
*B25J 9/16* (2006.01)

(52) U.S. Cl.
CPC ............ *G06Q 10/20* (2013.01); *B25J 9/1679* (2013.01)

(58) Field of Classification Search
None
See application file for complete search history.

(56) References Cited

U.S. PATENT DOCUMENTS

| 10,767,318 B2 | 9/2020 | Lindemulder et al. |
| 2020/0233436 A1 | 7/2020 | Fox et al. |

FOREIGN PATENT DOCUMENTS

| CN | 102424971 B | 6/2013 | |
| CN | 111203538 A | * 5/2020 | ............. B22F 1/052 |

(Continued)

OTHER PUBLICATIONS

Disclosed Anonymously, "Remote Polymer Deposition Repair/Mitigation", IPCOM000224826D, Jan. 7, 2013, 3 Pages. https://priorart.ip.com/IPCOM/000224826.

(Continued)

*Primary Examiner* — Khoi H Tran
*Assistant Examiner* — Bryant Tang
(74) *Attorney, Agent, or Firm* — Rakesh Roy

(57) ABSTRACT

A method, computer system, and a computer program product for defect repair is provided. The present invention may include detecting a defect in a structure. The present invention may include generating a repair plan to fix the defect using a plurality of work robots. The present invention may include programming the plurality of work robots with task assignments. The present invention may include deploying the programmed plurality of work robots to a staging area proximate to the defect. The present invention may include locating a target area of the defect using the programmed plurality of work robots. The present invention may include placing a repair material at the staging area. The present invention may include filling the located target area with the repair material using the programmed plurality of work robots. The present invention may include fusing the repair material with the located target area to fix the detected defect.

20 Claims, 8 Drawing Sheets

(56) References Cited

FOREIGN PATENT DOCUMENTS

RU            2680166 C1 *   2/2019
WO    WO-2017081029 A2 *   5/2017

OTHER PUBLICATIONS

L&L Furnace, "What is Powder Metal Manufacturing?", L&L Special Furnace Co, Inc., Feb. 14, 2019, 16 Pages. https://llfurnace.com/blog/powder-metal-manufacturing/.

Mell et al., "The NIST Definition of Cloud Computing", Recommendations of the National Institute of Standards and Technology, NIST Special Publication 800-145, Sep. 2011, 7 pages.

NPL 4: Cite should be: MPIF, "Making Metal Powder", MPIF.org, [accessed Apr. 5, 2022], 2 pgs., Retrieved from the Internet: <https://www.mpif.org/IntrotoPM/MakingMetalPowder.aspx>.

Steager, et al., "Chapter 9—Magnetic Microrobots for Microbiology," in: Kim et al. (Eds.) Microbiorotics (Second Edition) (ScienceDirect, 2017), pp. 163-195. https://www.sciencedirect.com/science/article/pii/B9780323429931000161.

Wikipedia, "Microbotics", Wikipedia.org, [accessed May 25, 2022], 3 pgs., Retrieved from the Internet: <https://en.wikipedia.org/wiki/Microbotics>.

Wikipedia, "Powder Metallurgy", Wikipedia.org, [accessed Apr. 4, 2022], 15 pgs., Retrieved from the Internet: <https://en.wikipedia.org/wiki/Powder_metallurgy>.

* cited by examiner

PARTICIPATION OF ROBOTS IN DEFECT REPAIR

BACKGROUND

The present invention relates generally to the field of computing, and more particularly to the participation of robots in defect repair.

In various scenarios, it may not be possible to repair internal defects in a structure from the outside. In such scenarios, the structure may need to be completely dismantled to gain access to the internal defect needing repair. Dismantling and rebuilding a structure may be costly, time-consuming, and lead to additional defects in the structure.

SUMMARY

Embodiments of the present invention disclose a method, computer system, and a computer program product for defect repair. The present invention may include detecting a defect in a structure. The present invention may include generating a repair plan to fix the defect using a plurality of work robots. The present invention may include programming the plurality of work robots with task assignments. The present invention may include deploying the programmed plurality of work robots to a staging area proximate to the defect. The present invention may include locating a target area of the defect using the programmed plurality of work robots. The present invention may include placing a repair material at the staging area. The present invention may include filling the located target area with the repair material using the programmed plurality of work robots. The present invention may include fusing the repair material with the located target area to fix the detected defect.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
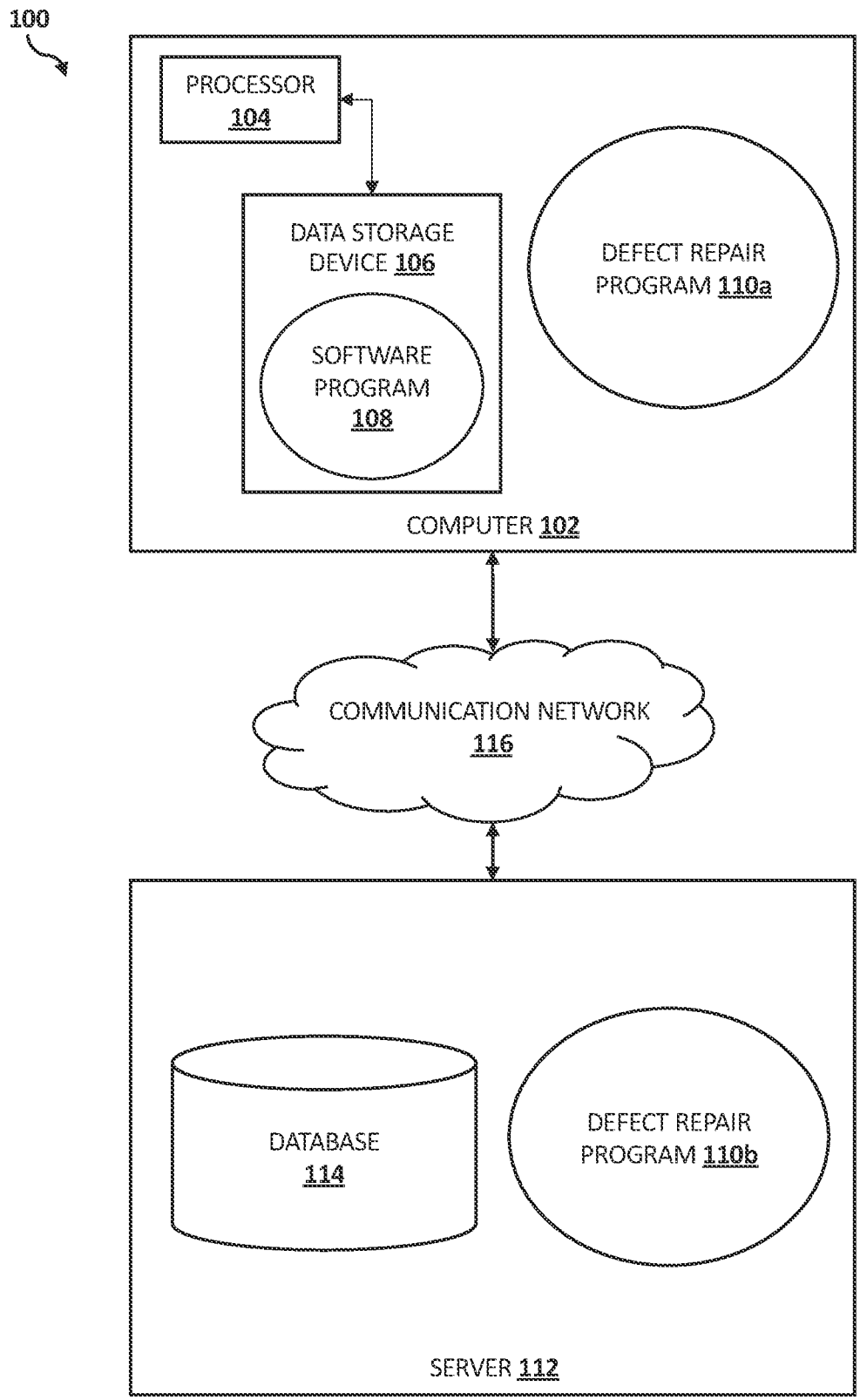
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for repairing structural defects using robots. As such, the present embodiment has the capacity to improve the technical field of structural maintenance by implementing small-scale robots to repair structural defects using a repair material such as, for example, metal powder. More specifically, a defect repair program may detect a defect in a structure. Next, the defect repair program may generate a repair plan to fix the defect in the structure using one or more robots. Then, the defect repair program may program the one or more robots with a set of task assignments based on the generated repair plan to fix the defect in the structure. Next, the defect repair program may deploy the one or more robots to a staging area proximate to a target area of the defect in the structure. Then, the defect repair program may place a repair material at the staging area. Next, the defect repair program may fill the target area with the repair material using the programed one or more robots. Thereafter, in response to determining that the target area is filled with the repair material, the defect repair program may fuse the repair material with the target area to fix the defect in the structure.

As described previously, in various scenarios, it may not be possible to repair internal defects in a structure from the outside. In such scenarios, the structure may need to be completely dismantled to gain access to the internal defect needing repair. Dismantling and rebuilding a structure may be costly, time-consuming, and lead to additional defects in the structure.

Therefore, it may be advantageous to, among other things, provide a way to use a multi-robot system of small-scale mobile robots to inspect and repair defects in a structural component, that may be too small for humans to access, without dismantling the entire structure. It may also be advantageous to use powder material, such as, for example, metal powder, as the repair material for repairing structural defects without dismantling the entire structure. Metal powder may be advantageous because the metal powder may be compressed and sintered to fill and repair cracks and cavities, which include complex geometries.

According to one embodiment, a multi-robot system may refer to a group of robots cooperating to execute a specific goal. In one embodiment, the multi-robot system may implement a swarm robotics approach in which a large number of mobile robots produce a desired collective behavior from the local interactions between the mobile robots and the interactions of the mobile robots with the surrounding environment.

According to one embodiment, the small-scale mobile robots of the disclosed multi-robot system may include a variety of miniature robot sizes. For example, the small-scale robots of the multi-robot system may include nanorobots (e.g., dimensions at or below 1 micrometer), microrobots (e.g., dimensions less than 1 millimeter), millirobots (e.g., dimensions less than 1 centimeter), and/or mini-robots (e.g., dimensions less than 10 centimeters).

According to one embodiment, the small-scale mobile robots of the disclosed multi-robot system may use metal powder or other powder materials to repair structural defects, such as, for example, cracks and cavities.

According to one embodiment, the present disclosure may enable identifying the location of a crack, cavity and/or other defect within a structure using visual inspection capabilities and/or Internet of things (IoT) feed analysis. In some embodiments, the present disclosure may enable using historical learning to predict the approximate defect location where a repair may need to be performed.

According to one embodiment, the present disclosure may enable identifying one or more available passages within the structure such that the mobile robots may access the target area of the defect for repair. In one embodiment, the present disclosure may enable identifying an appropriate route for the mobile robots so that the target area is filled within the shortest possible time.

According to one embodiment, the present disclosure may enable using visual simulation and/or scanning results to identify a staging area for the repair material near the target area of the defect. In one embodiment, the mobile robots may be programmed to carry the repair material from the staging area to the target area of the defect. In one embodiment, the present disclosure may enable using one or more secondary robots to initially deploy the mobile robots to the staging area.

According to one embodiment, the mobile robots may be capable of gripping small particles of the repair material and perform movement towards the target area of the defect. In one embodiment, the mobile robots may include swarm robotic functionalities such that the robots may collaborate with each other to perform the tasks.

According to one embodiment, the dimensions of the repair material may be comparatively small or comparatively large relative to the mobile robot. In one embodiment, if the dimension of the material particle is comparatively larger than the mobile robots, then multiple mobile robots may be implemented to carry the repair material to the target area of the defect.

According to one embodiment, the present disclosure may enable the mobile robots to perform multiple trips between the staging area, where the mobile robots may pick up the repair material, and the target area of the defect, where the mobile robots may drop the repair material to fill in the target area with the repair material.

According to one embodiment, the present disclosure may enable using the mobile robots to identify when the target area is completely filled with the repair material. In one embodiment, the present disclosure may enable using historical data to learn when the target area may be determined to be completely filled with the repair material.

According to one embodiment, the mobile robots may collaborate with each other and cover the target area where the repair material is placed. In one embodiment, the mobile robots may perform a compression and sintering process to form a solid mass of material by heat and/or pressure. Based on the applied pressure and/or heat, the repair material may solidify and fuse with the structure to be repaired. Once the repair task is completed, the mobile robots may come out from the structure and be removed by the secondary robots.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a defect repair program 110a. The networked computer environment 100 may also include a server 112 that is enabled to run a defect repair program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 6, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the defect repair program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the defect repair program 110a, 110b (respectively) to utilize a multi-robot system of small-scale robots to identify and repair defects (e.g., micro-cracks, micro-cavities) in a structural part using powder material particles. The disclosed embodiments are explained in more detail below with respect to FIGS. 2 to 5.

Figure 2:
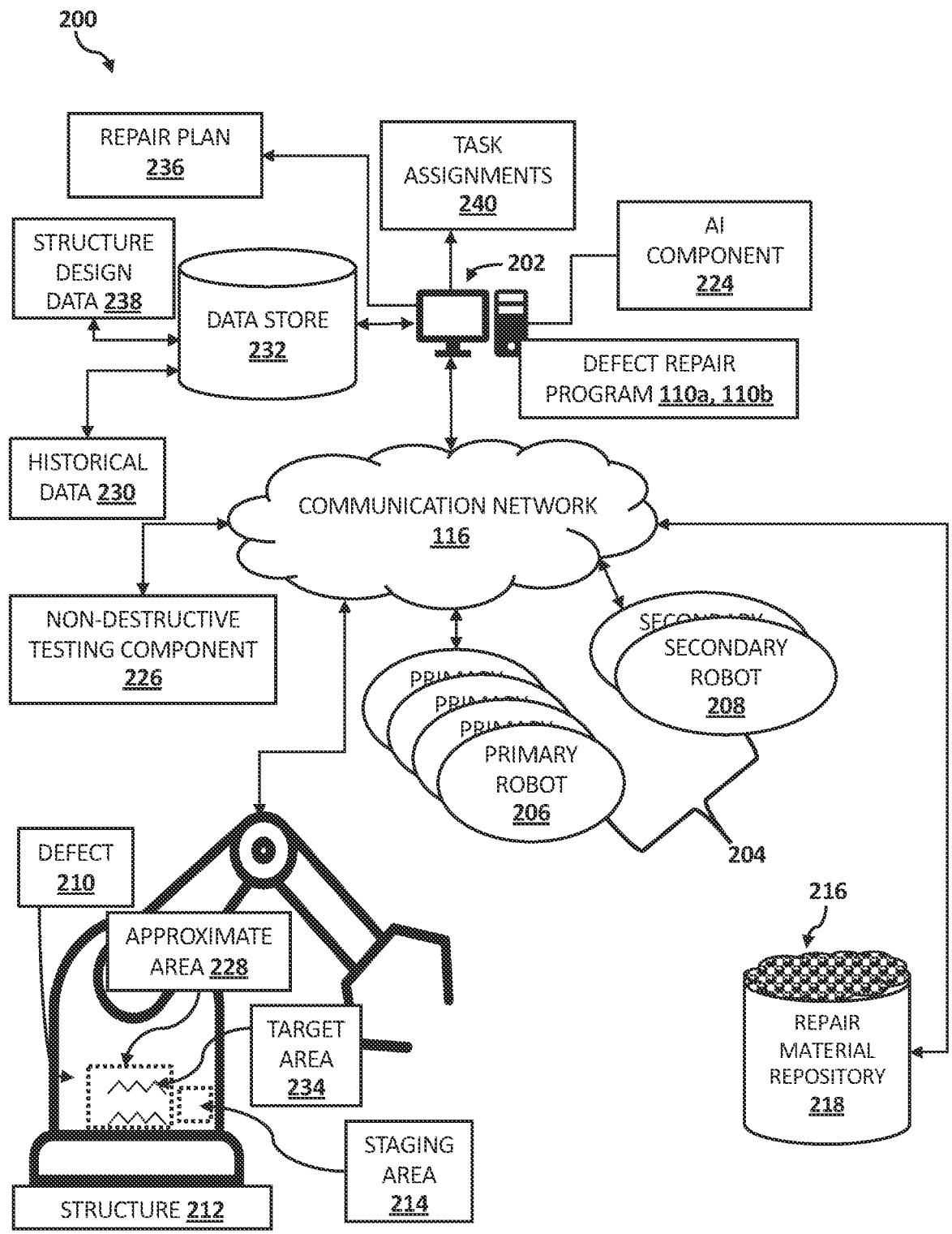
FIG. 2 is a schematic block diagram of a defect repair environment according to at least one embodiment.

Referring now to FIG. 2, a schematic block diagram of a defect repair environment 200 implementing the defect repair program 110a, 110b according to at least one embodiment is depicted.

According to one embodiment, the defect repair environment 200 may include one or more components (e.g., client computer 102; server computer 112; communication network 116) of the computer environment 100 discussed above with reference to FIG. 1. While programming and data of the exemplary embodiments may be stored and accessed remotely across several servers via the communication network 116, programming and data of the exemplary embodiments may alternatively or additionally be stored locally on as few as one physical computing device or amongst other computing devices than those depicted.

According to one embodiment, the defect repair environment 200 may include a computer system 202 having a tangible storage device and a processor that is enabled to run the defect repair program 110*a*, 110*b*. In one embodiment, the computer system 202 may include one or more computers, each having memory and at least one processor. In various embodiments, one or more computers of the computer system 202 may include a workstation, a personal computing device, a laptop computer, a desktop computer, a computing server, a thin-client terminal, a tablet computer, a smartphone, a smart watch or other smart wearable device, or other electronic devices. In at least one embodiment, the computer system 202 may include a cloud-based robotic control system and operate in a cloud computing service model, such as Software as a Service (SaaS), Platform as a Service (PaaS), or Infrastructure as a Service (IaaS). In one embodiment, the computer system 202 may also be located in a cloud computing deployment model, such as a private cloud, community cloud, public cloud, or hybrid cloud.

In one embodiment, the defect repair program 110*a*, 110*b* may include a single computer program or multiple program modules or sets of instructions being executed by the processor of the computer system 202. The defect repair program 110*a*, 110*b* may include routines, objects, components, units, logic, data structures, and actions that may perform particular tasks or implement particular abstract data types. The defect repair program 110*a*, 110*b* may be practiced in distributed cloud computing environments where tasks may be performed by local and/or remote processing devices which may be linked through the communication network 116. In one embodiment, the defect repair program 110*a*, 110*b* may include program instructions that may be collectively stored on one or more computer-readable storage media.

According to one embodiment, the defect repair environment 200 may include a multi-robot system 204 that is communicatively coupled to the computer system 202 over communication network 116. In one embodiment, the multi-robot system 204 may include a set of primary robots 206 and a set of secondary robots 208.

According to one embodiment, the communication network 116 may enable long range communication and/or short range communication between the computer system 202 and the multi-robot system 204. In various embodiments, the communication network 116 may also enable long range communication and/or short range communication between the robots (e.g., primary robots 206 and secondary robots 208) of the multi-robot system 204. For example, the communication network 116 may support communications using WiFi, Bluetooth® (Bluetooth and all Bluetooth—based trademarks and logos are trademarks or registered trademarks of Bluetooth SIG, Inc. and/or its affiliates), and/or Near Field Communication (NFC).

In at least one embodiment, the communication network 116 may enable peer-to-peer connectivity between the robots. For example, each robot may be programmed or configured to operate with other robots in cooperation, e.g., as a swarm. In one embodiment, the primary robots 206 may have the same design and/or capabilities (e.g., deposition of repair material, fusing of repair material with the structure to cure the defect, coordination). In other embodiments, one or more of the primary robots 206 may have separate capabilities.

According to one embodiment, the computer system 202 may implement a Global Positioning System (GPS) and optical sensors (e.g., cameras on the robots of the multi-robot system 204) to enable determining the location of the computer system 202 and/or the location of each robot of the multi-robot system 204 during the repair process.

As will be further described below, the primary robot 206 may include a small-scale mobile robot configured to inspect and repair one or more defects 210 in a structure 212, that may be too small for humans to access, without dismantling the entire structure 212. In various embodiments, the primary robot 206 may be referred to as a "work robot" and/or a "repair robot." According to one embodiment, the primary robot 206 of the disclosed multi-robot system 204 may include a variety of miniature robot sizes. For example, the primary robots 206 may include nanorobots (e.g., dimensions at or below 1 micrometer), microrobots (e.g., dimensions less than 1 millimeter), millirobots (e.g., dimensions less than 1 centimeter), and/or mini-robots (e.g., dimensions less than 10 centimeters).

According to one embodiment, the secondary robot 208 may also include a mobile robot. In one embodiment, the secondary robot 208 may be configured to transport and deploy the primary robots 206 to a staging area 214 of the structure 212 needing repair. As such, the size of the secondary robot 208 may be comparatively larger than that of the primary robot 206. In one embodiment, the staging area 214 may include a strategic location proximate the defect 210, as will be described further below. In at least one embodiment, the secondary robot 208 may also be configured to transport a repair material 216 (e.g., metal powder) from a repair material repository 218 to the staging area 214. In various embodiments, the secondary robot 208 may be referred to as a "transport robot" and/or a "deployment robot."

According to one embodiment, the computer system 202 may control each robot (e.g., primary robot 206; secondary robot 208) of the multi-robot system 204 as a central controller. Alternatively, each robot may include its own memory and processing components for performing task assignments, communicating with other robots, and/or coordinating tasks among the robots as described further herein.

In one embodiment, the robots of the multi-robot system 204 may be autonomous (e.g., having no centralized controller) and the computer system 202 may control operations based on a repair plan 220 and subsequent task assignments 222, as well as algorithms provided by an artificial intelligence (AI) component 224 that prescribes behavior changes in response to various conditions (e.g., sensed information about the local surroundings). In at least one embodiment, the computer system 202 may also monitor the operation of the multi-robot system 204 and adjust controls and/or communicate with the robots based on the monitoring analysis.

According to one embodiment, the AI component 224 of the computer system 202 may enable the primary robots 206 to implement swarm intelligence, such that a desired collective behavior is achieved (e.g., defect repair) from the local interactions among the primary robots 206 and between the primary robots 206 and the surrounding environment.

According to one embodiment, the design repair environment 200 may include a non-destructive testing (NDT) component 226 that is communicatively coupled to the computer system 202 over communication network 116. In one embodiment, the defect repair program 110*a*, 110*b* may implement the NDT component 226 to determine an approximate area 228 of the defect 210 in the structure 212. In one embodiment, the NDT component 226 may include electromagnetic testing methods (e.g., eddy-current testing), radiographic testing methods (e.g., x-ray testing), sound testing methods (e.g., ultrasonic testing), and/or visual inspection testing methods (e.g., camera inspection) to examine the structure 212 for integrity, composition, or condition with no alteration of the structure 212 undergoing the examination.

According to one embodiment, the NDT component 226 may include various IoT devices which may enable continuous monitoring of the performance of structure 212. In one embodiment, the real-time data provided by the IoT devices may enable predictive maintenance to predict when the structure 212 may fail. In one embodiment, the defect pair environment 200 may include historical data 230 stored in a data store 232 is communicatively coupled to the computer system 202. In one embodiment, the historical data 230 may be associated with the structure 212 and may indicate one or more variables associated with a safe operating structure 212. In one embodiment, the defect repair program 110a, 110b may compare the historical data 230 with the data captured by the IoT devices of the NDT component 226 to determine potential structural failures. In one embodiment, the historical data 230 may also indicate potential points of failure on the structure 212 and a failure timeline for the structure 212. In one embodiment, the defect repair program 110a, 110b may implement the NDT component 226 to test the structure 212 at the potential points of failure according to a frequency indicated by the failure timeline (e.g., testing every 4 to 6 months). In one embodiment, the AI component 224 may work with the NDT component 226 to classify defects and other structural issues based on, for example, imaging and/or sound data. As described previously, the output of the NDT component 226 may include the approximate area 228 of the defect 210. In one embodiment, the defect repair program 110a, 110b may implement the primary robots 206 to identify target area 234 (e.g., precious location) of the defect 210 using the optical sensors (e.g., cameras) of the primary robots 206.

According to one embodiment, the defect repair program 110a, 110b may generate a repair plan 236 in response to detecting the defect 210 by the NDT component 226. In one embodiment, the repair plan 236 may indicate the repair process to fix or cure the defect 210 as a series of operations that may be performed by the multi-robot system 204.

In one embodiment, the repair plan 236 may include identifying an optimal passage within the structure 212 for the primary robots 206 to perform movement and access the defect 210. In some embodiments, the defect repair program 110a, 110b may implement the AI component 224 to simulate various passages within the structure 212 using structure design data 238 stored in data store 232. In one embodiment, the structure design data 238 may include schematic drawings and/or any virtual representation of the structure 212.

In one embodiment, the repair plan 236 may include identifying the staging area 214 that may be optimal for placing repair material 216 and/or deploying the primary robots 206. In one embodiment, the defect repair program 110a, 110b may also determine the staging area 214 based on simulating the structure 212 using the structure design data 238.

In one embodiment, the repair plan 236 may include determining a number of primary robots 206 that may be needed to fix the defect 210. In at least one embodiment, the defect repair program 110a, 110b may determine the number of primary robots 206 needed for the repair based on the type of the defect 210 and/or an approximate size of the defect 210. In one embodiment, the defect repair program 110a, 110b may also consider other suitable variables when determining the number of primary robots 206 needed for the repair of structure 212. For example, the defect repair program 110a, 110b may analyze the dimension and shapes of the repair materials 216 particles and determine if a single primary robot 206 can carry the individual particles of the repair material 216 or if multiple primary robots 206 may be needed to carry the individual particles of the repair material 216.

According to one embodiment, the defect repair program 110a, 110b may generate a set of task assignments 240 based on the repair plan 236. In one embodiments, the task assignments 240 may be configured to be performed by the multi-robot system 204, namely the primary robots 206, to achieve the goals set out by the repair plan 236.

In one embodiment, the task assignments 240 for the primary robots 206 may be associated with inspecting the approximate area 228 of the defect 210 to identify the target area 234 (e.g., precision location) associated with the defect 210.

In one embodiment, the primary robots 206 may acquire imagery of the approximate area 228 of the defect 210 and the defect repair program 110a, 110b may implement the AI component 224 to detect cracks, discontinuities, and/or other flaws in the acquired images of the structure 212.

In at least one embodiment, the task assignments 240 for the primary robots 206 may be associated with measuring the dimensions of the target area 234 to determine the amount of repair material 216 that may be needed to fix the defect 210.

In one embodiment, the task assignments 240 for the primary robots 206 may also be associated making one or more trips to move the repair material 216 from the staging area 214 to the target are 234.

In one embodiment, the task assignments 240 for the primary robots 206 may also be associated with monitoring the progress of filling the target area 234 to determine when the target area 234 is sufficiently filled with the repair material 216 based on historical data 230.

In one embodiment, the task assignments 240 for the primary robots 206 may also be associated performing a compression and sintering process to form a solid mass of material by heat and/or pressure. Based on the pressure and/or heat applied by the primary robots 206, the repair material 216 may solidify and fuse with the structure to be repaired. In at least one embodiment, the compression and sintering process may also be performed by an external compression and/or sintering device.

According to one embodiment, the defect repair program 110a, 110b may program the primary robots 206 with one or more of the task assignments 240 detailed above. In one embodiment, the defect repair program 110a, 110b may program the secondary robot 208 to deploy the primary robots 206 at the staging area 214 so that the primary robots 206 may initiate movement. In one embodiment, the defect repair program 110a, 110b may also program the secondary robot 208 to place the repair material 216 at the staging area 214 from the repair material repository 218 in a manner in which the repair material 216 does not block the passage of the primary robots 206. In at least one embodiment, the defect repair program 110a, 110b may determine the amount of repair material 216 to place at the staging area 214 based on the images of the target area 234 of the defect 210 captured by the primary robots 206. For example the defect repair program 110a, 110b may determine the amount of repair material 216 needed to repair the defect 210 based on the dimensions of the cavity associated with the defect 210.

According to one embodiment, the programmed primary robots 206 may identify an optimum route for transporting the repair material 216 from the staging area 214 to the target area 234 of the defect 210 while performing local collision avoidance with the other primary robots 206 as well as the environment. In one embodiment, the defect repair program 110a, 110b may enable the programmed primary robots 206 to perform multiple trips to pick up the repair material 216 and deposit the repair material 216 at the target area 234. In one embodiment, the defect repair program 110a, 110b may enable the programmed primary robots 206 to collaborate with each other and cover the target area 234 where the repair material 216 is placed to fuse the repair material 216 with the structure 212 to be repaired. Once the repair of the defect 210 is completed, the defect repair program 110a, 110b may enable the programmed primary robots 206 to be removed from the structure 212 by the secondary robot 208.

Figure 3:
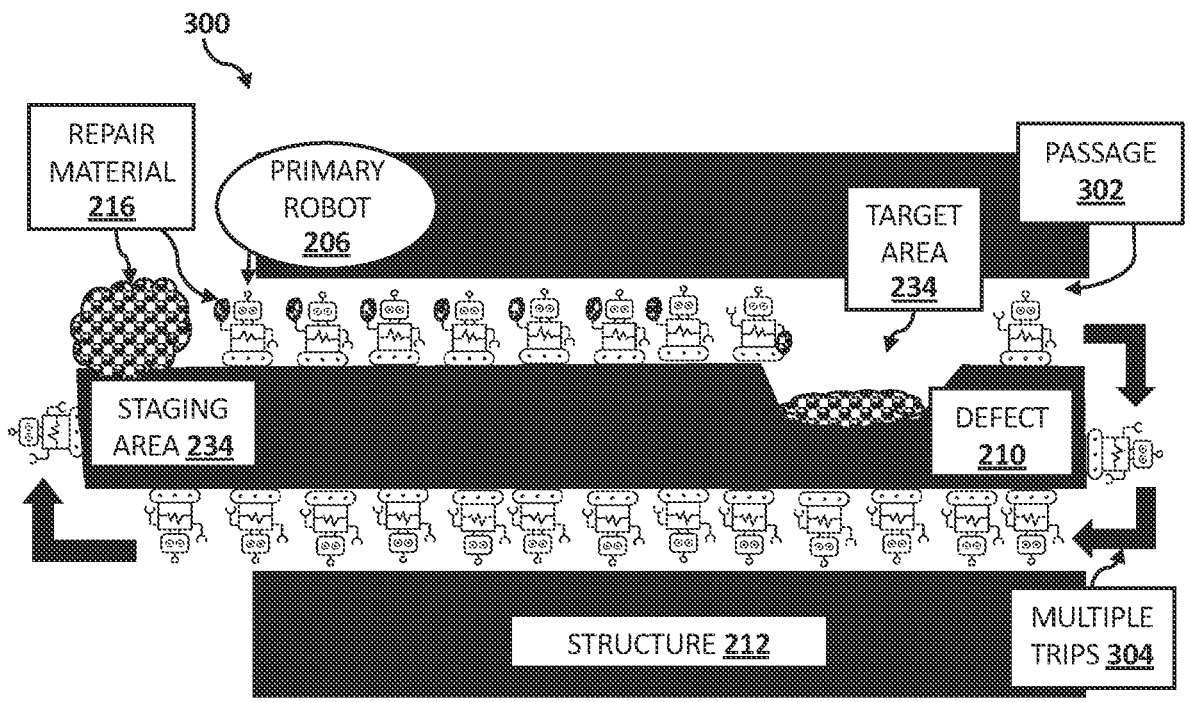
FIG. 3 is a block diagram illustrating a first exemplary defect repair process according to at least one embodiment.

Referring now to FIG. 3, a block diagram 300 illustrating a first exemplary defect repair process used by the defect repair program 110a, 110b according to at least one embodiment is depicted.

According to one embodiment, the defect repair program 110a, 110b may identify an optimal passage 302 within the structure 212 for the primary robots 206 to perform movement and access the target area 234 of the defect 210. In some embodiments, the defect repair program 110a, 110b may also identify the staging area 214 that may be optimal for placing the repair material 216 and/or deploying the primary robots 206. In one embodiment, the primary robots 206 may identify and travel the optimal passage 302 for transporting the repair material 216 from the staging area 214 to the target area 234 of the defect 210 while performing local collision avoidance with the other primary robots 206 as well as the environment.

In one embodiment, the defect repair program 110a, 110b may program the primary robots 206 to identify the target area 234 (e.g., precise location) associated with the defect 210 based on acquiring imagery of the approximate area 228 (FIG. 2) of the defect 210 and implementing the AI component 224 (FIG. 2) to detect cracks, discontinuities, and/or other flaws in the acquired images of the approximate area 228 of the defect 210.

In at least one embodiment, the defect repair program 110a, 110b may program the primary robots 206 to measure the dimensions of the target area 234 to determine the amount of repair material 216 that may be needed to fix the defect 210. In one embodiment, the defect repair program 110a, 110b may program the primary robots 206 to perform multiple trips 304 to move the repair material 216 from the staging area 214 to the target are 234.

In one embodiment, the defect repair program 110a, 110b may program the primary robots 206 to monitor the progress of filling the target area 234 to determine when the target area 234 is sufficiently filled with the repair material 216 based on historical data 230.

Figure 4:
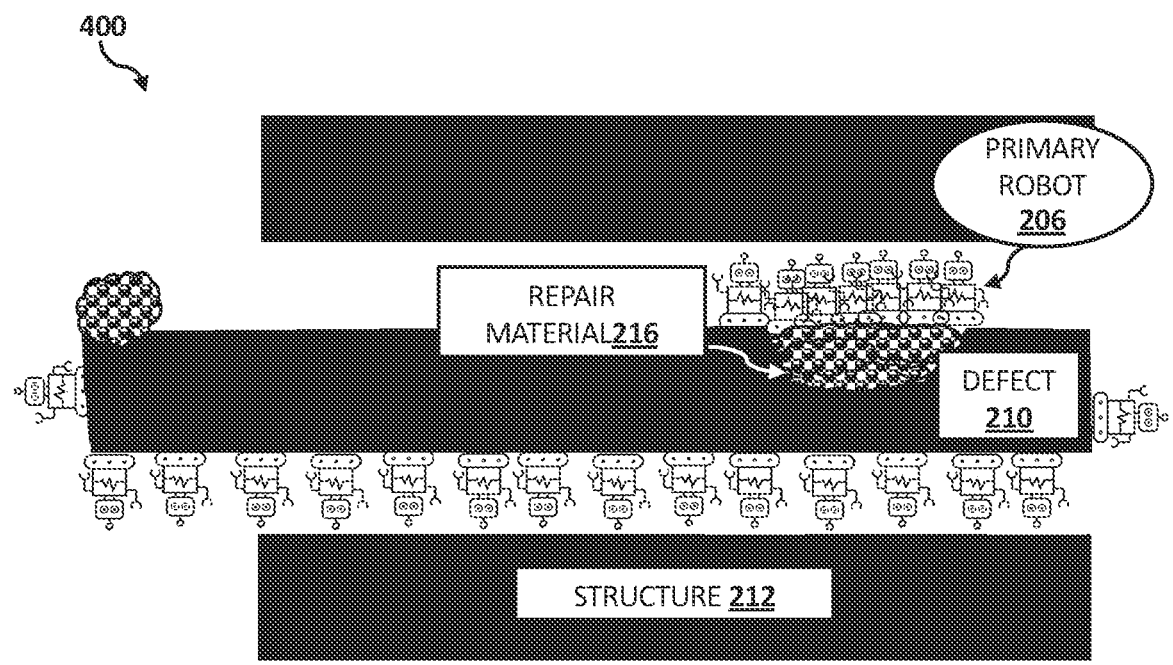
FIG. 4 is a block diagram illustrating a second exemplary defect repair process according to at least one embodiment

Referring now to FIG. 4, a block diagram 400 illustrating a second exemplary defect repair process used by the defect repair program 110a, 110b according to at least one embodiment is depicted.

According to one embodiment, after the repair material 216 is deposited at the target area 234 (FIG. 3) where the repairing is to be performed, the defect repair program 110a, 110b may program the primary robots 206 to perform a compression and sintering process to form a solid mass of material by heat and/or pressure. Based on the pressure and/or heat applied by the primary robots 206, the repair material 216 may solidify and fuse with the structure 212 to be repaired. More specifically, the defect repair program 110a, 110b may enable the programmed primary robots 206 to collaborate with each other and cover the target area 234 where the repair material 216 is placed to fuse the repair material 216 with the structure 212 to be repaired. In at least one embodiment, the compression and sintering process may also be performed by an external compression and/or sintering device. Once the repair of the defect 210 is completed, the defect repair program 110a, 110b may enable the programmed primary robots 206 to be removed from the structure 212 by the secondary robot 208.

Figure 5:
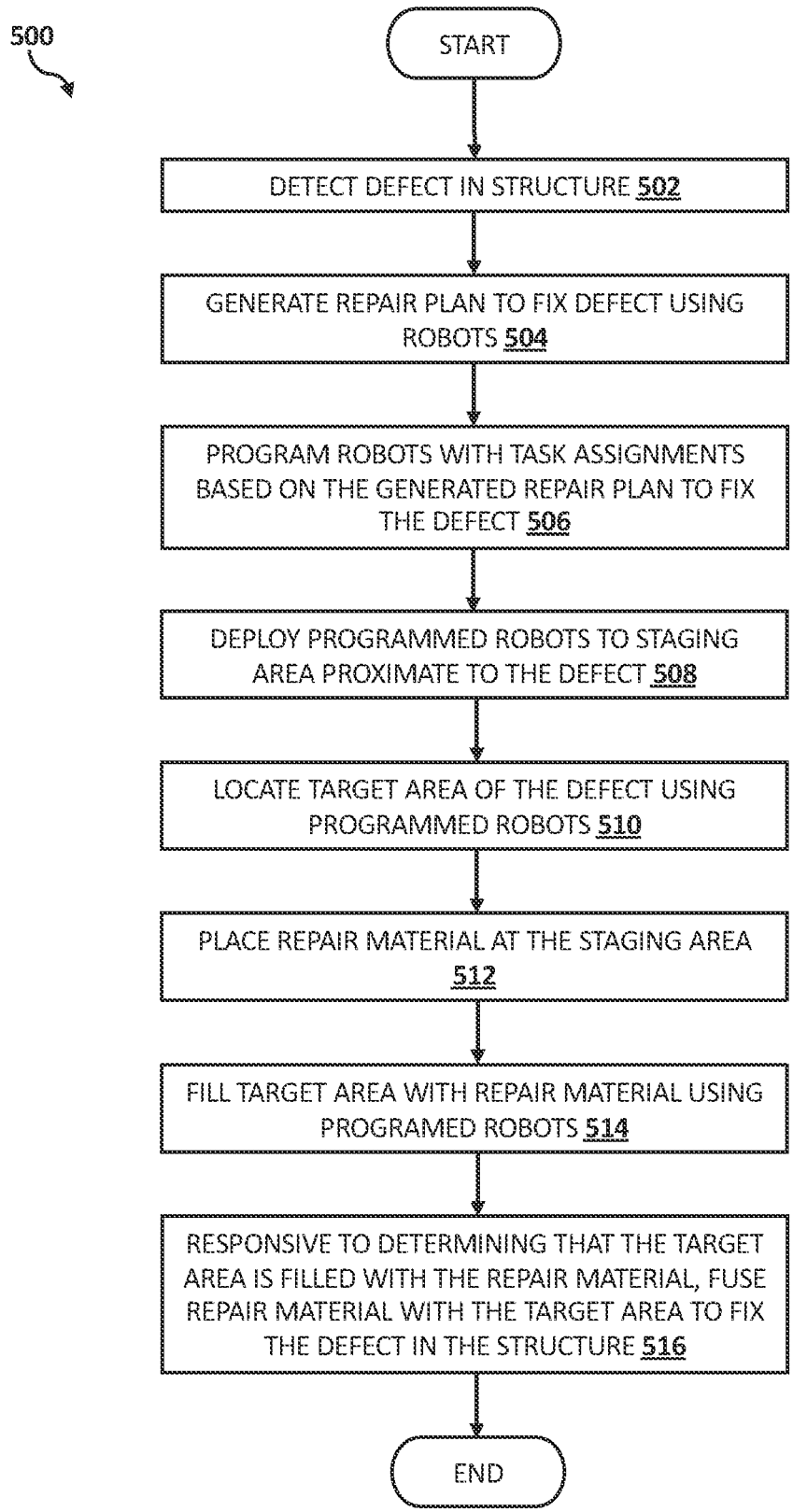
FIG. 5 is an operational flowchart illustrating a process for defect repair according to at least one embodiment.

Referring now to FIG. 5, an operational flowchart illustrating the exemplary defect repair process 500 used by the defect repair program 110a, 110b according to at least one embodiment is depicted. According to one embodiment, FIG. 5 provides a general description of the defect repair process 500 with reference to previously described FIGS. 2 to 4.

At 502, a defect is detected in a structure. According to one embodiment, the defect repair program 110a, 110b may implement an NDT component to examine the structure for integrity, composition, or condition, as described previously with reference to FIG. 2. In one embodiment, the NDT component may include electromagnetic testing methods (e.g., eddy-current testing), radiographic testing methods (e.g., x-ray testing), sound testing methods (e.g., ultrasonic testing), and/or visual inspection testing methods (e.g., camera inspection). In one embodiment, various historical data may be associated with the structure and may indicate one or more variables associated with a safe operating structure. In one embodiment, the defect repair program 110a, 110b may compare the historical data with the data captured by the IoT devices of the NDT component to determine potential structural failures or defects. In one embodiment, the defect repair program 110a, 110b may implement the NDT component to determine an approximate area of the defect, as described previously with reference to FIG. 2.

Then at 504, a repair plan is generated to fix the defect using work robots. According to one embodiment, the defect repair program 110a, 110b may generate a repair plan which indicates the repair process to fix or cure the defect as a series of operations that may be performed by one or more work robots (e.g., primary robot 206).

According to one embodiment, the repair plan generated by the defect repair program 110a, 110b may include identifying an optimal passage within the structure for one or more work robots to perform movement and access the defect, as described previously with reference to FIG. 2. In one embodiment, the repair plan may include identifying a staging area that may be optimal (e.g., optimized for fastest repair operation) for placing repair material and/or deploying the work robots. In one embodiment, the repair plan may include determining a number of work robots that may be needed to fix the detect. In at least one embodiment, the defect repair program 110a, 110b may determine the number of work robots needed for the repair based on the type of the defect 210 and/or an approximate size of the defect 210. In one embodiment, the repair plan may include determining the type of repair material to use (e.g., type of metal powder) cure the defect based on material of the structure. In one embodiment, the defect repair program 110a, 110b may also analyze the dimension and shapes of the repair material particles and determine if a single work robot can carry the individual particles of the repair material or if multiple work robots may be needed to carry the individual particles of the repair material.

Then at 506, one or more work robots are programmed with task assignments based on the generated repair plan to fix the defect. According to one embodiment, the defect repair program 110a, 110b may generate a set of task assignments based on the repair plan. In one embodiments, the task assignments may be configured to be performed by the work robots to achieve the goals set out by the repair plan, as described previously with reference to FIG. 2.

Then at 508, one or more programmed work robots are deployed to a staging area proximate to the defect. In one embodiment, the defect repair program 110a, 110b may program one or more deployment robots (e.g., secondary robot 208) to transport the work robots (e.g., from a robot storage location) to the staging area identified in the repair plan so that the work robots may initiate movement to complete the programmed task assignments, as described previously with reference to FIG. 2.

Then at 510, a target area of the defect is located using the programmed work robots. In one embodiment, the defect repair program 110a, 110b may implement the programmed work robots to identify the target area (e.g., precise location) associated with the defect based on acquiring imagery of an approximate area of the defect and implementing an AI component to detect cracks, discontinuities, and/or other flaws in the acquired images of the approximate area of the defect, as described previously with reference to FIG. 2.

Then at 512, the repair material is placed at the staging area. In at least one embodiment, the defect repair program 110a, 110b may implement the programmed work robots to measure the dimensions of the target area to determine the amount of repair material that may be needed to fix the defect. As described previously with reference to FIG. 2, the defect repair program 110a, 110b may program a deployment robot (e.g., secondary robot 208) to place the repair material at the staging area from a repair material repository in a manner in which the repair material does not block the passage of the work robots in the structure needing repair.

Then at 514, the target area is filled with the repair material using the programmed work robots. According to one embodiment, the defect repair program 110a, 110b may identify an optimal passage within the structure for the work robots to perform movement and access the target area of the defect. As described previously with reference to FIG. 2, the work robots may identify and travel the optimal passage for transporting the repair material from the staging area to the target area of the defect while performing local collision avoidance with the other work robots as well as the environment. In one embodiment, the defect repair program 110a, 110b may enable the programmed work robots to perform multiple trips to pick up the repair material from the staging area and deposit the repair material at the target area.

Thereafter at 516, responsive to determining that the target area is filled with the repair material, the repair material is fused with the target area to fix the defect in the structure. In one embodiment, the defect repair program 110a, 110b may implement the programmed work robots to monitor the progress of filling the target area to determine when the target area is sufficiently filled with the repair material based on historical data.

According to one embodiment, after a sufficient amount of the repair material is deposited at the target area, the defect repair program 110a, 110b may implement the programmed work robots to perform a compression and sintering process to form a solid mass of material by heat and/or pressure. In one embodiment, the defect repair program 110a, 110b may enable the programmed work robots to collaborate with each other and cover the target area where the repair material is placed. Then, the work robots may apply pressure and/or heat such that the repair material may solidify and fuse with the structure to fix the defect (e.g., a micro-crack). Once the repair of the defect is completed, the defect repair program 110a, 110b may enable the programmed work robots to be removed from the structure by the deployment robot.

Accordingly, the defect repair program 110a, 110b may improve the functionality of a computer because the defect repair program 110a, 110b may enable the computer to provide a way to use a multi-robot system of small-scale mobile robots to inspect and repair defects in a structural component, that may be too small for humans to access, without dismantling the entire structure. According to one embodiment, the defect repair program 110a, 110b may improve the functionality of a computer because the defect repair program 110a, 110b may enable the computer to provide a way implement swarm robotic functionalities such that the robots of the multi-robot system may collaborate with each other to perform the tasks. In one embodiment, the defect repair program 110a, 110b may also enable the computer to provide a way to use powder material, such as, for example, metal powder, as the repair material for repairing structural defects without dismantling the entire structure. Metal powder may be advantageous because the metal powder may be compressed and sintered to fill and repair cracks and cavities, which include complex geometries.

It may be appreciated that FIGS. 2 to 5 provide only an illustration of one embodiment and do not imply any limitations with regard to how different embodiments may be implemented. Many modifications to the depicted embodiment(s) may be made based on design and implementation requirements.

Figure 6:
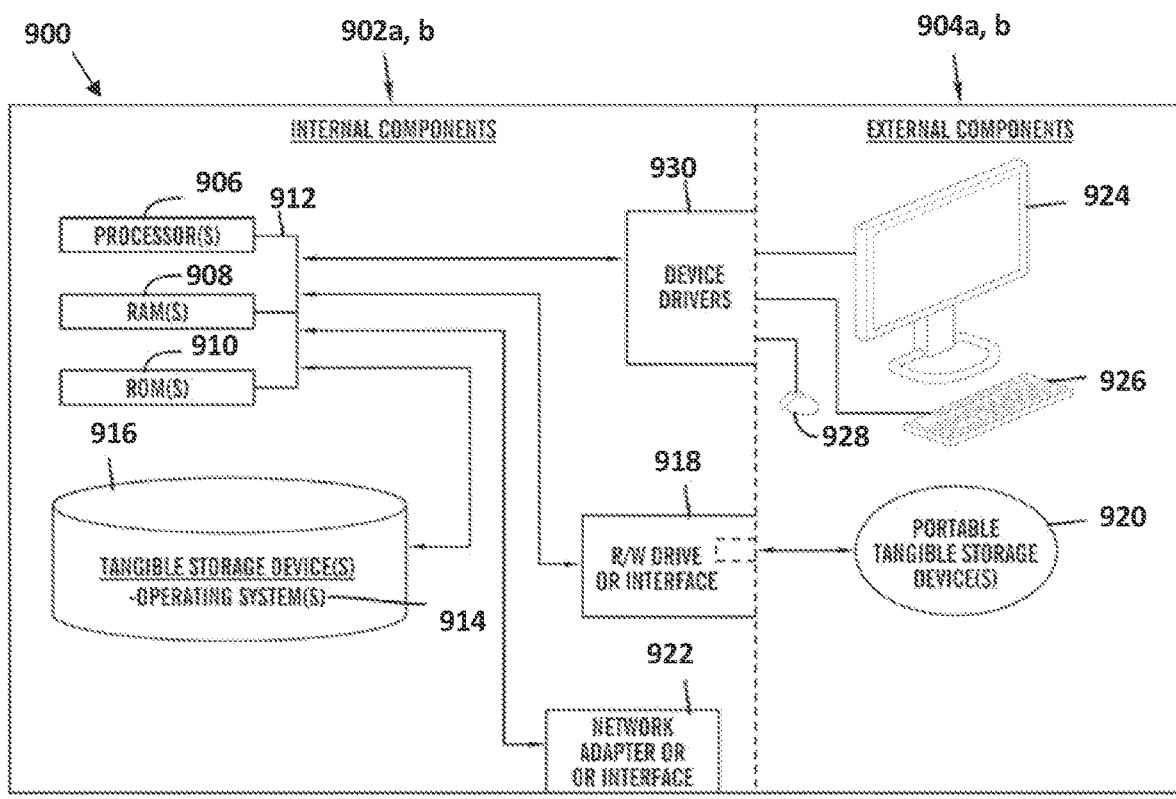
FIG. 6 is a block diagram of internal and external components of computers and servers depicted in FIG. 1 according to at least one embodiment.

FIG. 6 is a block diagram 900 of internal and external components of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 6. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the defect repair program 110a in client computer 102, and the defect repair program 110b in network server 112, may be stored on one or more computer-readable tangible storage devices 916 for execution by one or more processors 906 via one or more RAMs 908 (which typically include cache memory). In the embodiment illustrated in FIG. 6, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the defect repair program 110a and 110b can be stored on one or more of the respective portable computer-readable tangible storage devices 920, read via the respective RAY drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the defect repair program 110a in client computer 102 and the defect repair program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the defect repair program 110a in client computer 102 and the defect repair program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
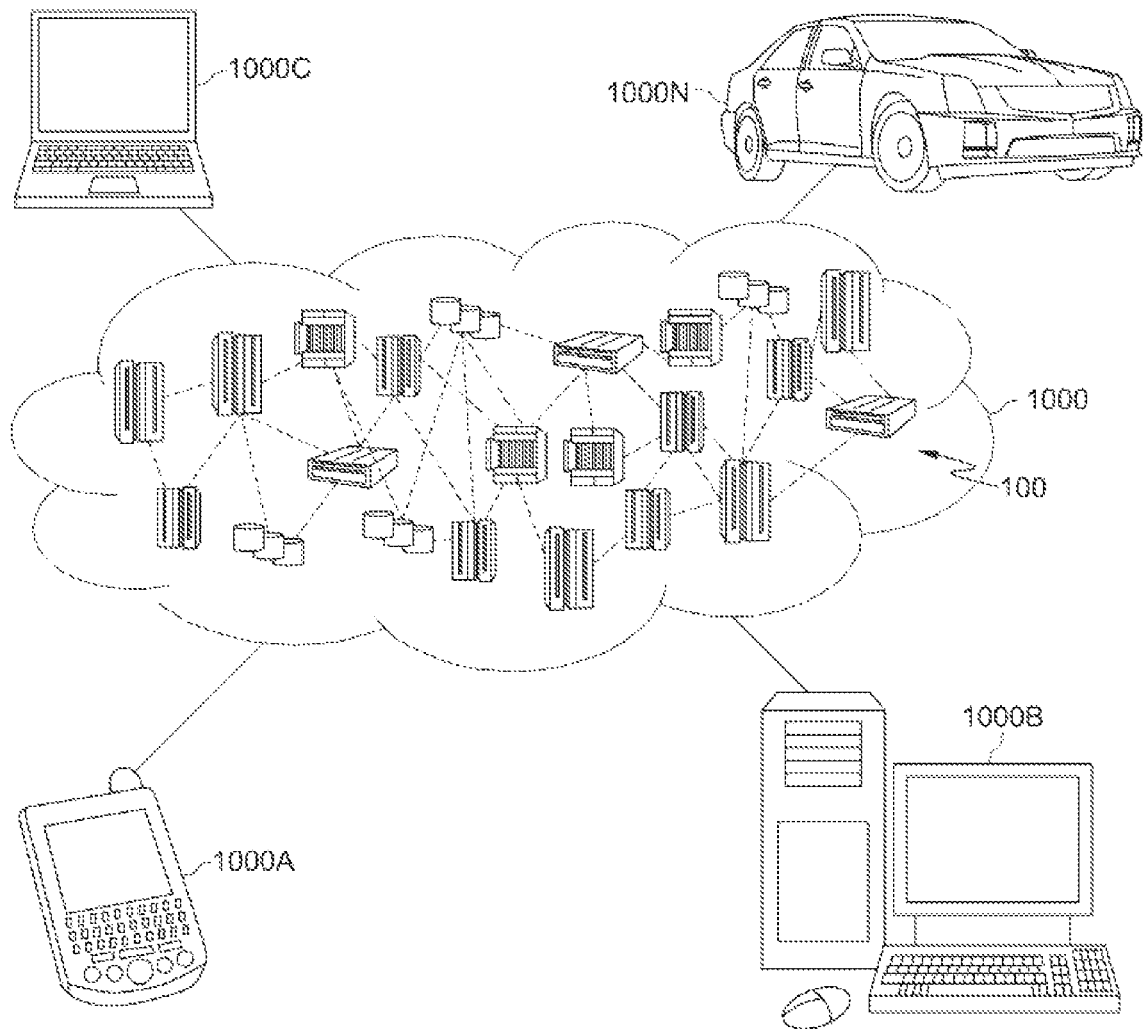
FIG. 7 is a block diagram of an illustrative cloud computing environment including the computer system depicted in FIG. 1, in accordance with an embodiment of the present disclosure.

Referring now to FIG. 7, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 7 are intended to be illustrative only and that computing nodes 100 and cloud computing environment 1000 can communicate with any type of computerized device over any type of network and/or network addressable connection (e.g., using a web browser).

Figure 8:
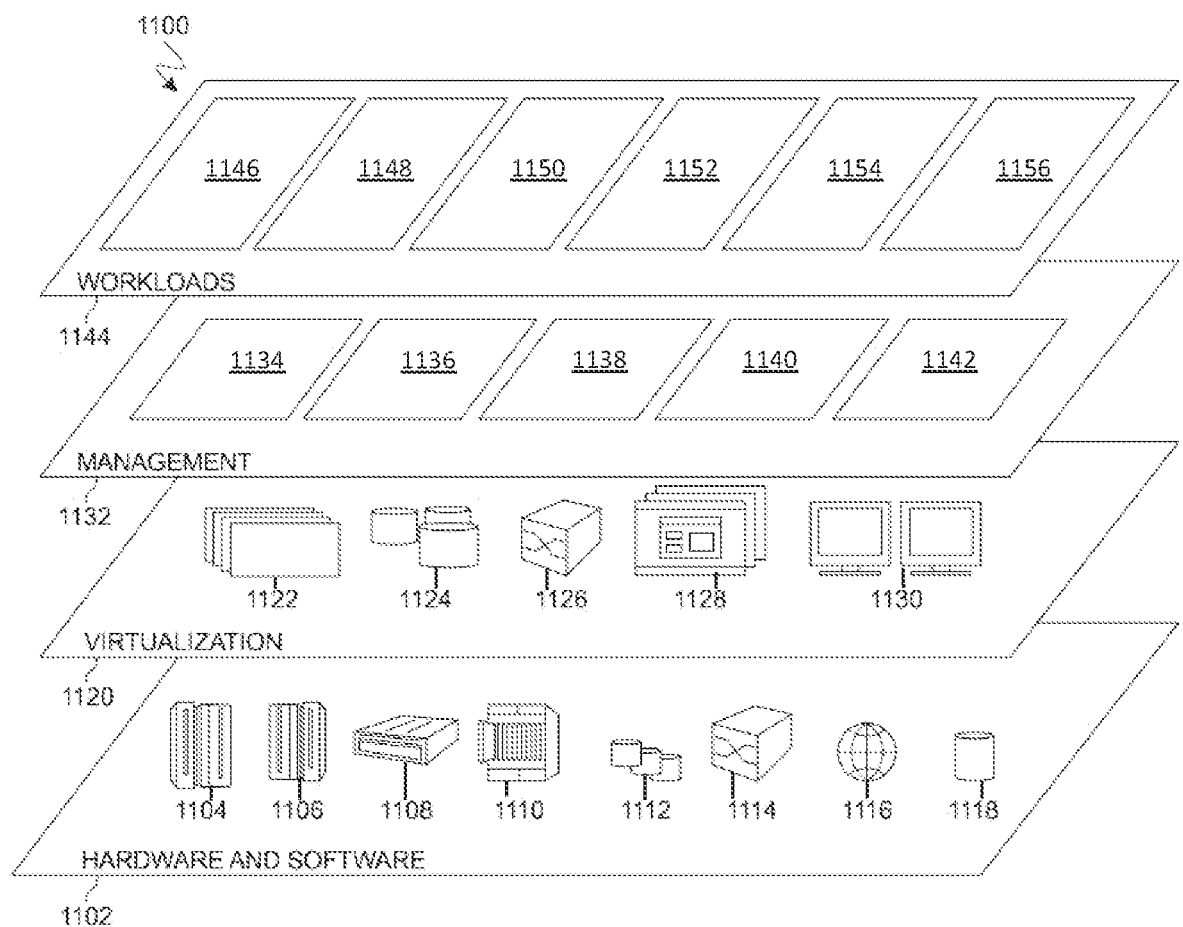
FIG. 8 is a block diagram of functional layers of the illustrative cloud computing environment of FIG. 7, in accordance with an embodiment of the present disclosure.

Referring now to FIG. 8, a set of functional abstraction layers 1100 provided by cloud computing environment 1000 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and defect repair 1156. A defect repair program 110a, 110b provides a way to utilize a multi-robot system of small-scale robots to identify and repair defects (e.g., cracks, cavities) in a structural part using powder material particles.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

detecting a defect in a structure;

generating a repair plan to fix the detected defect in the structure using a plurality of work robots;

programming the plurality of work robots with a set of task assignments based on the generated repair plan to fix the detected defect in the structure;

deploying the programmed plurality of work robots to a staging area proximate to the detected defect in the structure;

locating a target area of the detected defect using the programmed plurality of work robots;

placing a repair material at the staging area proximate to the detected defect in the structure;

filling the located target area of the detected defect with the repair material using the programmed plurality of work robots; and in response to determining that the located target area of the detected defect is filled with the repair material, fusing the repair material with the located target area to fix the detected defect in the structure.

2. The computer-implemented method of claim 1, wherein detecting the defect in the structure further comprises:

performing at least one non-destructive test to examine a composition of the structure; and determining an approximate area of the detected defect in the structure.

3. The computer-implemented method of claim 1, wherein the generated repair plan further comprises:

identifying, based on a simulation of the structure, an optimal passage within the structure for the programmed plurality of work robots to perform movement and access the detected defect.

4. The computer-implemented method of claim 1, wherein the generated repair plan further comprises:
determining a number of work robots in the programmed plurality of work robots based on a size of the detected defect.

5. The computer-implemented method of claim 1, wherein the generated repair plan further comprises:
analyzing a dimension of a particle of the repair material; and
determining, based on the analyzed dimension, a number of work robots of the programmed plurality of work robots needed to carry the particle of the repair material from the staging area to the located target area of the detected defect.

6. The computer-implemented method of claim 1, wherein locating the target area of the detected defect using the programmed plurality of work robots further comprises:
acquiring at least one image of an approximate area of the detected defect using the programmed plurality of work robots; and
analyzing the acquired at least one image of the approximate area of the detected defect to identify a flaw in the structure.

7. The computer-implemented method of claim 1, wherein deploying the programmed plurality of work robots to the staging area proximate to the detected defect in the structure further comprises:
programming a deployment robot to transport the programmed plurality of work robots from a robot storage location to the staging area proximate to the detected defect in the structure.

8. The computer-implemented method of claim 1, wherein the programmed plurality of work robots includes a miniature robot size selected from the group consisting of:
a nanorobot, a microrobot, a millirobot, and a mini-robot.

9. The computer-implemented method of claim 1, wherein fusing the repair material with the located target area to fix the detected defect in the structure further comprises:
covering the located target area where the repair material is placed using the programmed plurality of work robots working in collaboration with each other; and
performing a sintering process using the programmed plurality of work robots to solidify the repair material at the located target area.

10. A computer system for defect repair, comprising:
one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:
detecting a defect in a structure;
generating a repair plan to fix the detected defect in the structure using a plurality of work robots;
programming the plurality of work robots with a set of task assignments based on the generated repair plan to fix the detected defect in the structure;
deploying the programmed plurality of work robots to a staging area proximate to the detected defect in the structure;
locating a target area of the detected defect using the programmed plurality of work robots;
placing a repair material at the staging area proximate to the detected defect in the structure;
filling the located target area of the detected defect with the repair material using the programmed plurality of work robots; and
in response to determining that the located target area of the detected defect is filled with the repair material, fusing the repair material with the located target area to fix the detected defect in the structure.

11. The computer system of claim 10, wherein detecting the detected defect in the structure further comprises:
performing at least one non-destructive test to examine a composition of the structure; and
determining an approximate area of the detected defect in the structure.

12. The computer system of claim 10, wherein the generated repair plan further comprises:
identifying, based on a simulation of the structure, an optimal passage within the structure for the programmed plurality of work robots to perform movement and access the detected defect.

13. The computer system of claim 10, wherein the generated repair plan further comprises:
determining a number of work robots in the programmed plurality of work robots based on a size of the detected defect.

14. The computer system of claim 10, wherein the generated repair plan further comprises:
analyzing a dimension of a particle of the repair material; and
determining, based on the analyzed dimension, a number of work robots of the programmed plurality of work robots needed to carry the particle of the repair material from the staging area to the located target area of the detected defect.

15. The computer system of claim 10, wherein locating the target area of the detected defect using the programmed plurality of work robots further comprises:
acquiring at least one image of an approximate area of the detected defect using the programmed plurality of work robots; and
analyzing the acquired at least one image of the approximate area of the detected defect to identify a flaw in the structure.

16. The computer system of claim 10, wherein deploying the programmed plurality of work robots to the staging area proximate to the detected defect in the structure further comprises:
programming a deployment robot to transport the programmed plurality of work robots from a robot storage location to the staging area proximate to the detected defect in the structure.

17. The computer system of claim 10, wherein the programmed plurality of work robots includes a miniature robot size selected from the group consisting of:
a nanorobot, a microrobot, a millirobot, and a mini-robot.

18. The computer system of claim 10, wherein fusing the repair material with the located target area to fix the detected defect in the structure further comprises:
covering the located target area where the repair material is placed using the programmed plurality of work robots working in collaboration with each other; and
performing a sintering process using the programmed plurality of work robots to solidify the repair material at the located target area.

19. A computer program product for defect repair, comprising:
one or more computer-readable storage media and program instructions collectively stored on the one or more computer-readable storage media, the program instructions executable by a processor to cause the processor to perform a method comprising:
detecting a defect in a structure;
generating a repair plan to fix the detected defect in the structure using a plurality of work robots;
programming the plurality of work robots with a set of task assignments based on the generated repair plan to fix the detected defect in the structure;
deploying the programmed plurality of work robots to a staging area proximate to the detected defect in the structure;
locating a target area of the detected defect using the programmed plurality of work robots;
placing a repair material at the staging area proximate to the detected defect in the structure;
filling the located target area of the detected defect with the repair material using the programmed plurality of work robots; and
in response to determining that the located target area of the detected defect is filled with the repair material, fusing the repair material with the located target area to fix the detected defect in the structure.

20. The computer program product of claim 19, wherein fusing the repair material with the located target area to fix the detected defect in the structure further comprises:
covering the located target area where the repair material is placed using the programmed plurality of work robots working in collaboration with each other; and
performing a sintering process using the programmed plurality of work robots to solidify the repair material at the located target area.

\* \* \* \* \*